(12) United States Patent
Babbitt et al.

(10) Patent No.: US 7,866,105 B2
(45) Date of Patent: Jan. 11, 2011

(54) FLANGELESS INSULATION PRODUCT FOR COMPRESSION FITTING INTO INSULATION CAVITIES

(75) Inventors: William M. Babbitt, New Albany, OH (US); Williard W. Price, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 850 days.

(21) Appl. No.: 10/453,731

(22) Filed: Jun. 3, 2003

(65) Prior Publication Data

US 2004/0244335 A1    Dec. 9, 2004

(51) Int. Cl.
  *E04B 1/62* (2006.01)
  *E04B 1/74* (2006.01)

(52) U.S. Cl. .......... 52/404.1; 52/407.3; 52/309.1; 52/309.13; 52/309.16; 52/309.9; 52/407.2; 52/406.2

(58) Field of Classification Search ........ 52/404.1, 52/406.1, 407.3, 405.1, 309.1, 309.4, 309.5, 52/309.6, 309.15, 309.16, 406.2, 407.2, 404.3, 52/404.5, 309.7, 309.8, 309.13
See application file for complete search history.

(56) References Cited

U.S. PATENT DOCUMENTS

| 681,938 | A | | 9/1901 | Stevens |
|---|---|---|---|---|
| 1,767,168 | A | | 6/1930 | Burt, Jr. |
| 2,159,053 | A | | 5/1939 | Saborsky |
| 2,864,324 | A | * | 12/1958 | MacMillan .............. 52/478 |
| 3,958,385 | A | * | 5/1976 | Bondra et al. ............ 52/404.1 |
| 4,866,905 | A | | 9/1989 | Bihy et al. |
| 5,108,957 | A | | 4/1992 | Cohen et al. |
| 5,250,488 | A | | 10/1993 | Thelohan et al. |
| 5,421,133 | A | * | 6/1995 | Berdan et al. ............ 52/404.1 |
| 5,466,504 | A | | 11/1995 | Gavin et al. |
| 6,042,911 | A | * | 3/2000 | Berdan, II ............. 428/36.3 |
| 6,083,603 | A | | 7/2000 | Patel et al. |
| 6,191,057 | B1 | | 2/2001 | Patel et al. |
| 6,221,464 | B1 | | 4/2001 | Patel et al. |
| 6,357,504 | B1 | | 3/2002 | Patel et al. |

* cited by examiner

*Primary Examiner*—Jeanette E. Chapman
(74) *Attorney, Agent, or Firm*—MacMillan, Sobanski & Todd, LLC

(57) ABSTRACT

A system provides insulation products for a plurality of insulation wall cavities in buildings, where a substantial portion of the insulation wall cavities have a known nominal width. The system includes providing flangeless insulation products having a blanket of fibrous insulation material and having a facing material with a width substantially equal to the width of the insulation blanket, with the width of the insulation blanket and the width of the facing material being greater than the nominal width of the plurality of insulation cavities. The increased width of the facing material to improves the seal of the facing material when the insulation product is placed within insulation wall cavities of the known nominal width in comparison to the seal provided by flanged insulation products applied with inset stapling to the same insulation wall cavities.

33 Claims, 8 Drawing Sheets

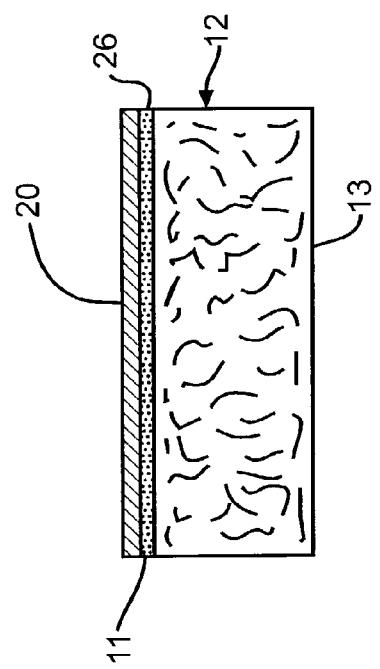
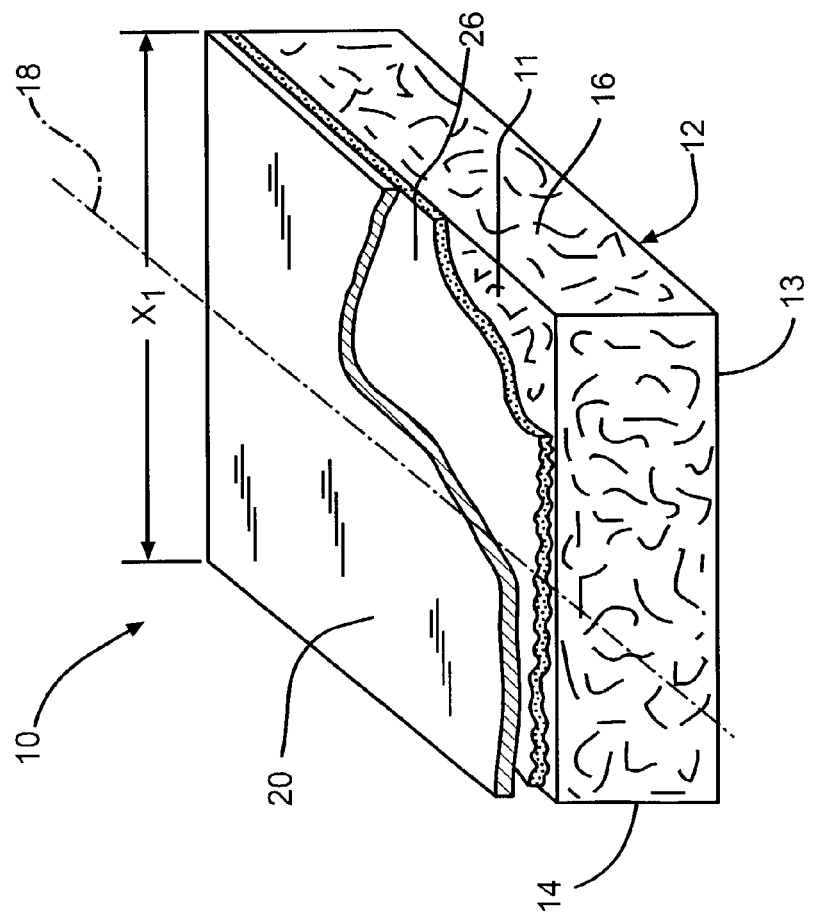

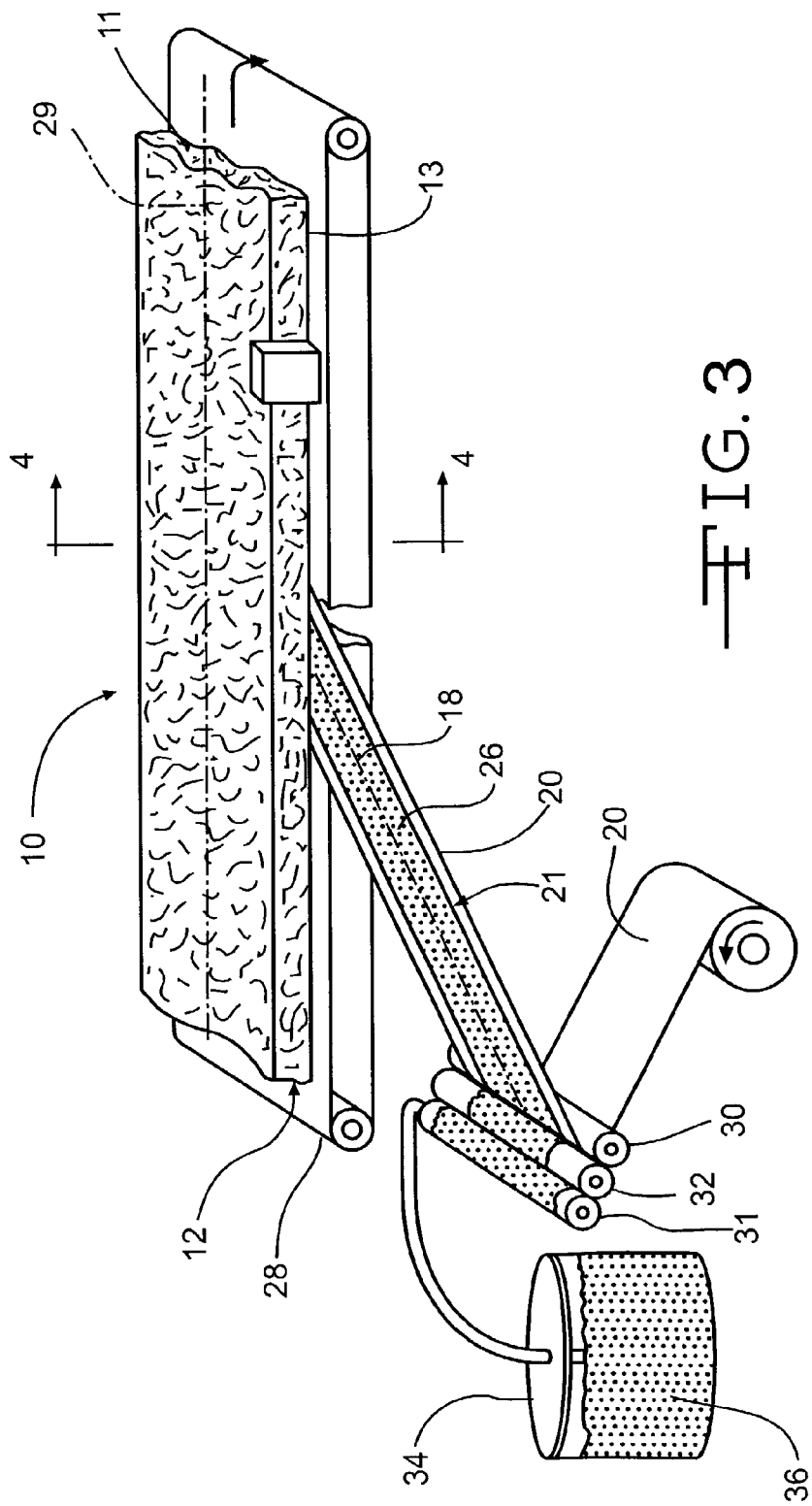

FLANGELESS INSULATION PRODUCT FOR COMPRESSION FITTING INTO INSULATION CAVITIES

TECHNICAL FIELD

This invention relates to a fibrous insulation product. In particular, this invention pertains to a flangeless fibrous insulation product that is designed for compression fitting into wall cavities of a known nominal width in buildings.

BACKGROUND OF THE INVENTION

Fibrous insulation is typically formed by fiberizing molten material and depositing the fibers on a collecting conveyor. Typically the fibers for insulation products are mineral fibers, such as glass fibers, although some insulation products are made of organic fibers, such as polypropylene and polyester. Most fibrous insulation products contain a binder material to bond the fibers together where they contact each other, forming a lattice or network. The binder gives the insulation product resiliency for recovery after packaging, and provides stiffness and handleability so that the product can be handled and applied as needed in the wall cavities of buildings. During manufacturing the insulation is cut into widths and lengths to form individual insulation products, and the insulation products are packaged for shipping to customer locations.

Insulation products may also have a facing applied to one or more of the major surfaces of the fibrous insulation product. The facing is generally applied using an adhesive material, and the facing, adhesive material, or combination serve several important functions. First, the facing and/or adhesive serves as a vapor barrier for the insulation product. A vapor barrier is necessary to prevent moisture-laden air from the warm interior of the dwelling from entering the insulation. Otherwise, the water vapor in the warm interior air would enter the insulation material and then cool and condense within the insulation or on the outside sheathing. This would result in a damp insulation product, which is incapable of performing at its designed efficiency. In conjunction with serving as a vapor barrier, the facing material is often used to facilitate the installation of the product. Faced insulation products use a flanged facing material, meaning the facing extends beyond the edges of the major surface of the insulation material. Insulation products that do not include the flanged facing and adhesive are also used; however, a vapor barrier material, such as plastic sheeting, may then be installed. Finally, the facing and adhesive provide stiffness to the assembled insulation product, thus improving the handleability of the insulation product.

One such known insulation product is a insulation batt, usually about 8 feet long, and generally suitable for use as wall insulation in standard wall cavities in residential and commercial structures. Standard wall cavities generally include cavities having a width averaging about 14½ inches or 22½ inches where the spacing distances between the studs that define the wall cavity are 16 and 24 inches, respectively. Faced insulation products containing flange portions are generally designed to be installed by mechanically fastening the flange portion of the insulation batt to the studs defining each edge of the wall cavity. Unfaced insulation products are generally designed to be installed by using a separate layer of material fastened to provide the necessary vapor barrier protection. Installation associated with both types of products is often time consuming, labor intensive, and subsequently expensive, due to the necessity of containing the insulation product using additional layers of material and/or fastening means. Installation of stapled flanges often results in gaps between staples securing the facing, and this can lead to air leaks and moisture absorption into the insulation product. These gaps between the fastening means or the placement of an additional vapor barrier material can also result in an unattractive appearance of the installed product as well.

It is also known to utilize binderless fibrous insulation products to produce insulation batts. Binderless fibrous insulation products are generally contained within an exterior layer, such as a kraft paper or polyethylene sleeve of material, and cut into batts for use in insulating wall cavities. Binderless products are significantly less rigid than hindered insulation products, thus making the binderless product more difficult to install. A compression fit installation is the typical installation method for these types of binderless products, meaning the insulation batt is deformed such that the binderless product fills the insulation cavity. However, binderless products lack the stiffness of bindered products, subsequently making the binderless products hard to handle. Additionally, the fibers in binderless products can become unevenly distributed, and such uneven distribution has a negative impact on the performance of the insulation product.

Thus, it would be desirable to create an improved insulation product.

SUMMARY OF THE INVENTION

The above objects as well as other objects not specifically enumerated are achieved by a system for providing insulation products for a plurality of insulation wall cavities in buildings, where a substantial portion of the insulation wall cavities have a known nominal width. The system includes providing flangeless insulation products having a blanket of fibrous insulation material and having a facing material with a width substantially equal to the width of the insulation blanket, with the width of the insulation blanket and the width of the facing material being greater than the nominal width of the plurality of insulation cavities. The increased width of the facing material improves the seal of the facing material when the insulation product is placed within insulation wall cavities of the known nominal width in comparison to the seal provided by flanged insulation products applied with inset stapling to the same insulation wall cavities.

According to this invention there is also provided a system for providing insulation products for a plurality of insulation wall cavities in buildings, where a substantial portion of the insulation wall cavities have a known nominal width, the system comprising providing flangeless insulation products having a blanket of fibrous insulation material and a facing material, with the facing material having a width wider than the width of the insulation blanket by an amount within the range of from about 1.0 percent to about 3.0 percent of the width of the insulation blanket, with the width of the facing material being greater than the nominal width of the plurality of insulation cavities, wherein the increased width of the facing material improves the seal of the facing material when the insulation products are placed within insulation wall cavities of the known nominal width in comparison to the seal provided by flanged insulation products applied with inset stapling to the same insulation wall cavities.

According to this invention there is also provided a flangeless insulation bat that includes an elongated blanket of fibrous insulation material having edges defining a width of a major surface of the insulation blanket, wherein the width of the major surface is within the range of from about 15⅛ to about 15⅜ inches. The batt also includes an elongated strip of facing material adhered to the insulation blanket, wherein the facing material has a facing width substantially equal to the width of the insulation blanket.

According to this invention there is also provided a flangeless insulation batt that includes an elongated blanket of fibrous insulation material having edges defining a width of a major surface of the insulation blanket, wherein the width of the major surface is within the range of from about 14⅞ to about 15⅛ inches. The batt also includes an elongated strip of facing material adhered to the insulation blanket, the facing material having a width wider than the width of the insulation blanket by an amount within the range of from about 1.0 percent to about 3.0 percent of the width of the insulation blanket.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic perspective view of the insulation product of the present invention.

FIG. 2 is a sectional view of the insulation product.

FIG. 3 is a schematic view of the manufacturing process used to create the insulation product.

DETAILED DESCRIPTION OF THE INVENTION

Figure 4:
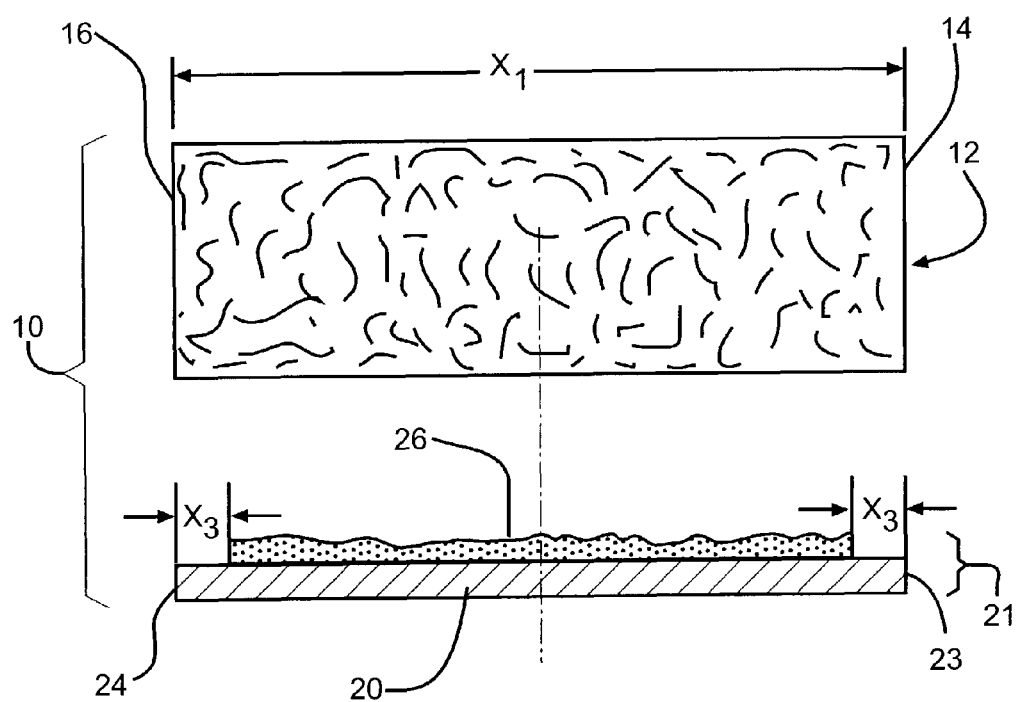
FIG. 4 is an exploded sectional view of the facing material and adhesive layer prior to installation on the insulation material.

While the description and drawings disclose insulation products of fiberglass insulation, it is to be understood that the insulation material can be any compressible fibrous insulation material, such as rock wool and such as polypropylene.

As shown in FIGS. 1 and 2, the insulation product of the invention, indicated generally at 10, is comprised of an elongated strip of fibrous insulation blanket 12, and a facing 20 adhered to a major surface defined by edges 14 and 16 of the fibrous insulation blanket 12. The fibrous insulation blanket 12 is preferably fibrous glass having a density within the range of from about 0.3 to about 1.5 pounds per cubic foot (pcf), although other densities can be used. Also, other fibers, such as mineral fibers of rock, slag or basalt, can be used as well as organic fibers, such as the polymer fibers polypropylene, polyester and polysulfide. The fibers are preferably, but not necessarily, bonded together with a binder material, such as a urea phenol-formaldehyde commonly used with fiberglass insulation, to provide stiffness to the fibrous insulation blanket 12. It will be appreciated that any binder material suitable for bonding the fibers together may be used.

The cross sectional shape of the fibrous insulation blanket 12, as shown in FIG. 1, is generally rectangular. This corresponds to the cross sectional shape, shown in FIG. 5, of a typical insulation wall cavity 42 in a typical wall structure, indicated generally at 40. The insulation blanket 12 generally has a first major surface 11 and a second major surface 13. The width of the major surfaces 11 and 13 is defined by a first edge surface 14 and a second edge surface 16 of the fibrous insulation blanket 12, with the overall uncompressed width being denoted by variable $X_1$. The overall width $X_1$ of the insulation blanket 12 is preferably larger than the known nominal width of a typical wall insulation cavity 42. For example, where the known nominal width of a typical wall insulation cavity 42 is about 14½ inches, the width of the insulation blanket 12 is preferably within the range of from about 14¾ inches to about 15⅜ inches, and most preferably within the range from about 15 inches to about 15⅜ inches. In one preferred embodiment of the invention, the overall width $X_1$ of the insulation blanket 12 is approximately 15¼ inches, although the overall width $X_1$ may be any dimension suitable for installation in typical insulation wall cavities 42. Although the insulation products described above pertain to insulation cavities on 16 inch centers, it is to be understood that the same principles apply for insulation cavities based on 24 inch centers.

Figure 5:
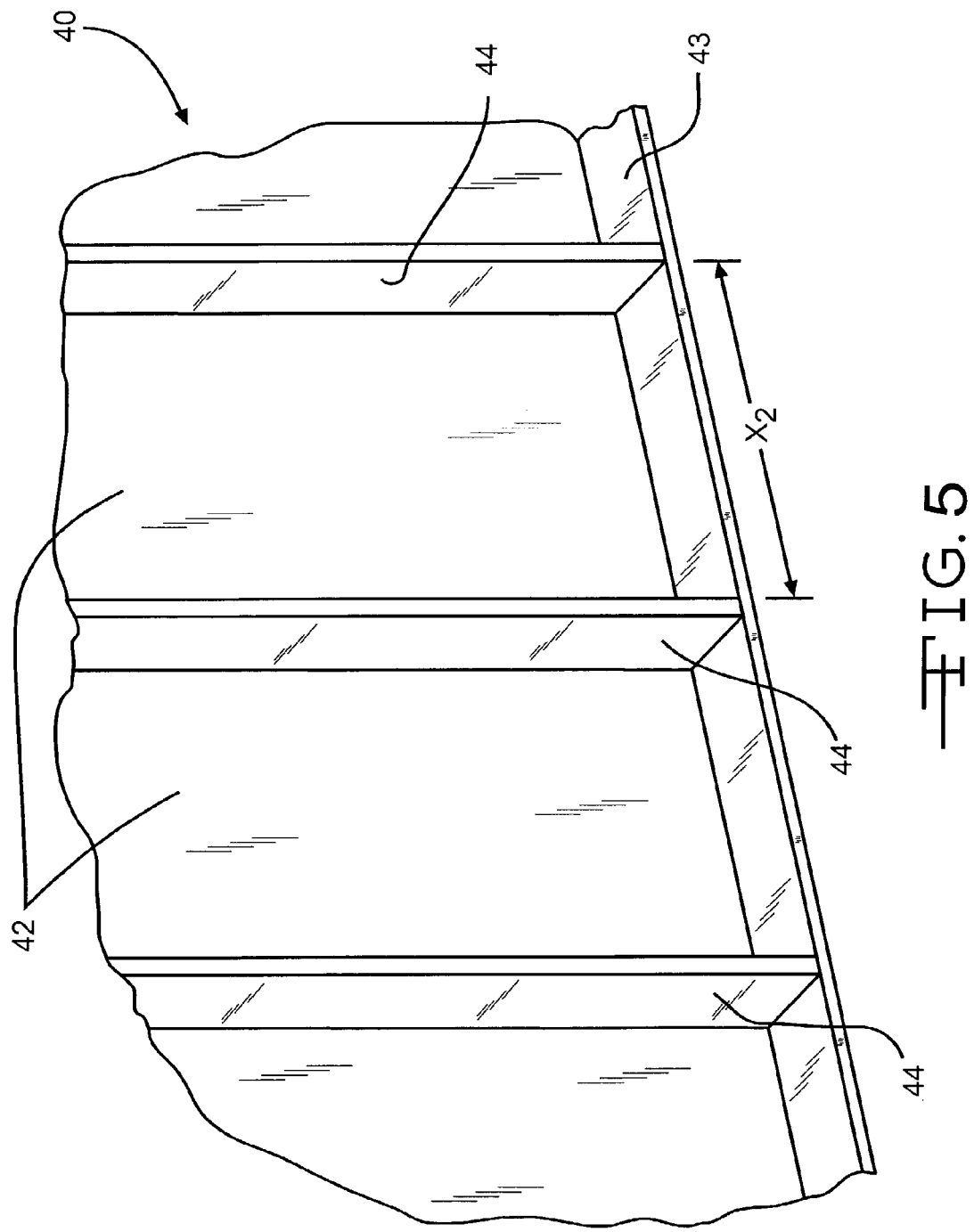
FIG. 5 is a perspective view of a building wall including individual wall cavities that are of a known nominal width.

FIG. 5 illustrates a typical wall structure, which includes a bottom plate 43 on which rests a plurality of studs 44. The bottom plate 43, studs 44, and a top plate (not shown) define the four sides of an insulation wall cavity 42. The studs 44 are placed at a known interval from one another to define wall cavities 42 having a known nominal average width, denoted by variable $X_2$. Typical wall structure construction generally places the studs at approximately 16 inch or approximately 24 inch intervals, measured from the center of each stud 44, with the studs 44 typically being approximately 1½ inches in width. Based upon this spacing, the nominal average width for typical wall cavities is approximately 14½ inches for 16 inch spacing, and 22½ inches for 24 inch spacing. A substantial portion, approximately ninety six percent, of all standard wall cavities fall within an acceptable tolerance range of one-half inch of the desired 14½ inch or 22½ inch cavity width. The front or interior side of the wall cavities 42 is typically covered with drywall for interior applications, and the back or exterior side of the wall cavities is typically covered with sheathing material, such as plywood, composite boards of compressed wood, or foam sheathing.

The preferred method of installation for the insulation product 10 is a compression fit installation, meaning that the insulation product 10 is compressed to conform to the dimensions of an insulation cavity 42 having a known nominal width $X_2$. To facilitate this method of installation, it is preferable that the overall width $X_1$ of the insulation blanket 12 be larger than the overall width $X_2$ of the insulation cavity 42. Generally, the width $X_1$ of the insulation material should be within the range of about 102 percent to about 107 percent of the known $X_2$ nominal width of the wall insulation cavity 42. In a preferred embodiment of the invention, the width $X_1$ of the insulation blanket 12 is within the range from about 14¾ inches to about 15½ inches, where the nominal insulation cavity width $X_2$ is about 14½ inches, and the width of the insulation blanket 12 is most preferably within the range of from about 15 inches to about 15¼ inches.

The insulation product 10 also includes a facing 20. The purpose of the facing 20 is both to provide a tough but somewhat flexible surface for the insulation product 10 and to provide vapor barrier protection for the insulation product 10. Although the preferred material for the facing 20 is asphalt/kraft paper or poly/kraft paper (kraft paper with a polymer layer, such as a polyethylene layer), as disclosed in Ser. No. 09/867,260 filed May 29, 2001 and Ser. No. 10/191,873 filed Jul. 9, 2002, entitled High Performance Kraft Facing for Fiberglass Insulation, invented by James G. Snyder, herein incorporated by reference, it is to be understood that any suitable facing material may be used. Examples of such other suitable materials include polyethylene film or foil facing materials. The facing 20 is preferably flangeless, meaning that the facing 20 has approximately the same overall width $X_1$ as the fibrous blanket 12, or else has a facing that does not exceed the width of the insulation blanket 12 by more than about ⅜ inches. Therefore, the preferred width of the facing 20 is within the range from about 14¾ inches to about 15⅜ inches, where the nominal insulation cavity width $X_2$ is about 14½ inches, and the width of the facing 20 is most preferably within the range from about 15 inches to about 15⅜ inches. The facing 20 is adhered to the fibrous blanket 12 by a layer 26 of adhesive material 36. The adhesive layer 26 is preferably continuous, although it can be discontinuous, such as in the form of strips, where the facing material itself provides the vapor barrier. The facing material 20, the adhesive layer 26, or the combination of both may form vapor barrier protection needed to prevent moisture from entering the fibrous blanket 12. Where vapor barrier protection is required, the preferred material for the adhesive layer 26 is an asphalt adhesive; however, any suitable non-porous adhesive material may be used. Where the insulation product does not need to provide vapor protection, any vapor porous adhesive material may also be used. In addition to its vapor barrier attributes, the adhesive layer 26 also contributes to the structural integrity of the insulation product 10, by increasing the rigidity of the insulation product 10 while allowing the insulation product 10 to maintain the desired compressibility and handleability characteristics.

To create the insulation product 10, as is illustrated in FIG. 3, the fibrous insulation blanket 12 is placed on conveying means 28 in such a manner that the major surface 13 is in contact with the conveyer 28. The adhesive material 36, is pumped from a reservoir 34 to an application roller 31. This adhesive application roller 31 contacts a second adhesive application roller 32, applying a layer of adhesive to the roller 32, with the width of the adhesive on roller 32 being equal to the desired width of the adhesive layer 26 to be applied to the facing material 20. The facing material 20, which is fed through another roller 30 rotatably engaged with the second adhesive application roller 32, is then coated with the adhesive layer 26, creating a coated facing component 21. The coated facing component 21 is then placed in contact with the major surface 13 on the bottom side of the insulation blanket 12 as it advances along the conveyer 28. The facing could also be applied to the top side. The facing component 21 is preferably oriented such that the facing component 21 is symmetrically aligned about the longitudinal center axis 29 of the fibrous insulation blanket 12, although in other embodiments of the invention, the facing component 21 is not so aligned. The strip of the combined insulation blanket 12 and facing component 21 is then cut into batts (not shown) having widths and lengths suitable for residential and commercial applications. A typical length for an insulation batt is approximately 8 feet, although the batts can be cut into any desired length. Also, it is to be understood that the product and method of the invention could be applied to insulation provided in continuous lengths, and packaged in roll form rather than batt form. It will be appreciated that any suitable method may be used for application of the adhesive material 36 to the facing material 20 to form the facing component 21.

FIG. 4 illustrates the facing component 21, which includes the facing material 20 coated with the adhesive layer 26 prior to the installation of the facing material 20 onto the insulation blanket 12. In a preferred embodiment, the width of the adhesive layer 26 applied by the second adhesive roller 32 during the manufacturing process is preferably less than the width of the facing material 20, although the decreased width of the adhesive layer 26 is not required. Additionally, the adhesive layer 26 is preferably symmetrically aligned about the longitudinal center axis 18 of the facing material 20. This symmetrical alignment results generally in the adhesive material's being substantially spaced apart from the edges 23, 24 of the facing material, and specifically yields approximately equal portions of uncoated facing material 20, denoted by variable $X_3$, at each edge 23, 24 of the facing material 20. Although axial alignment of the adhesive layer 26 is preferable, it will be appreciated that the adhesive layer 26 may be aligned in any configuration resulting in an uncoated portion $X_3$ at each edge 23, 24 of the facing material 20. The adhesive layer 26 is preferably smaller than the facing material 20 by an amount within the range of from about 0.25 inches to about 0.5 inches, although any width of the adhesive layer 26 within the range of from about ninety to about ninety-eight percent of the width of the facing material 20 would be suitable. Although the embodiment of the invention described above provides for uncoated portions of the facing material 20 at the edges, it is to be understood that in other embodiments of the invention the asphalt coating can extend the entire width of the facing material.

FIGS. 5 through 8 illustrate the preferred application for the insulation product 10. A particular advantage of the insulation product 10 and the method of this invention is the reduction in installation time for the insulation. This time savings is realized by using a compression fit installation technique for the insulation product 10.

Figure 6:
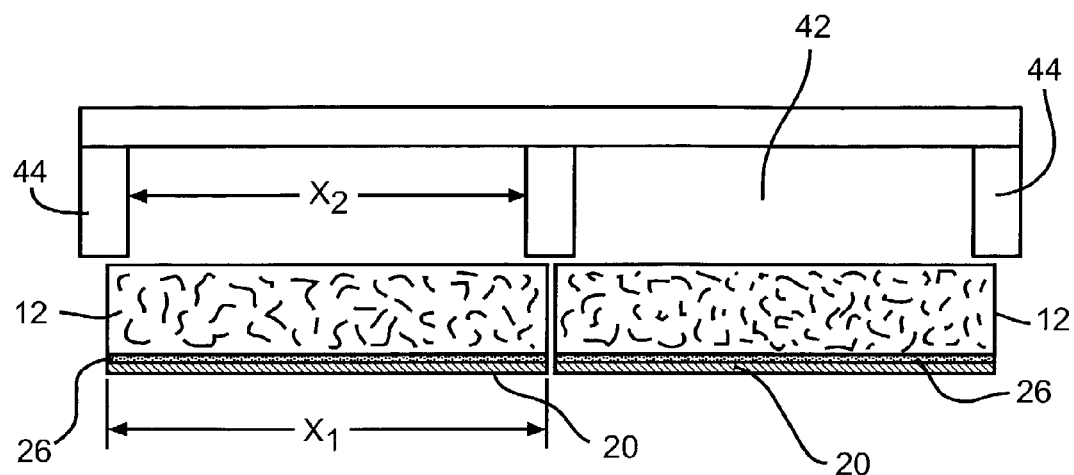
FIG. 6 is a top plan view of the insulation product relative to a wall cavity prior to installation.
Figure 7:
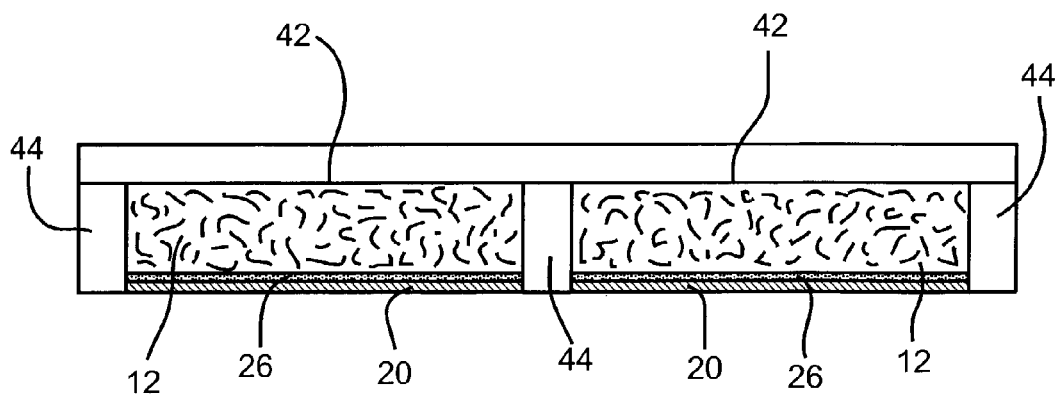
FIG. 7 is a top plan view of the insulation product installed in wall cavities of a known nominal width using a compression fit installation.
Figure 8:
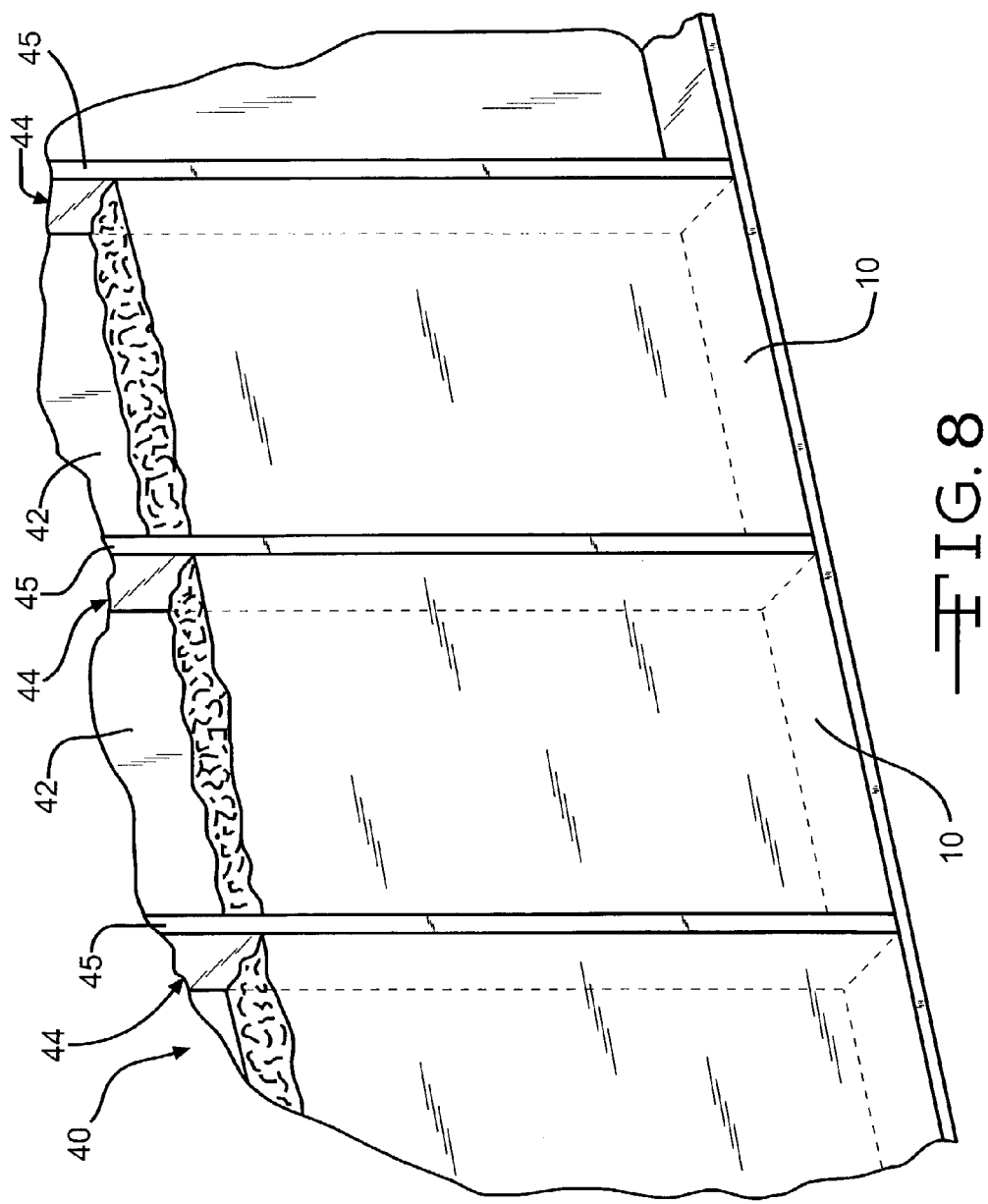
FIG. 8 is a perspective view of the insulation product compression fit installed into wall cavities of a known nominal width.

As previously discussed, a typical wall structure 40 contains a plurality of standard sized wall cavities 42, having an industry accepted known nominal width $X_2$. As FIG. 6 illustrates, the insulation product has an overall width $X_1$ that is larger than the wall cavity width $X_2$, which is the optimal width relation to use the compression fit installation technique. Compression fit installation occurs where an installer applies a compression force to the insulation product 10 at the edge surfaces 14, 16. This causes the overall width of the insulation product $X_1$ to become approximately equal or slightly less than the width $X_2$ of the wall cavity 42. Referring to FIG. 7, the compressed insulation product 10 is then placed into the insulation wall cavity 42, and the compression force applied by the installer is released from the insulation product 10. As shown in FIG. 8, the insulation product 10 then expands to fill the wall cavity 42. A lateral compressive force remains on the insulation product 10 due to the inability of the insulation product 10 to expand to its original uncompressed width $X_1$, and this force holds the insulation product 10 in place within the insulation cavity 42. Insulation products held in a wall cavity by the expansive forces of a slightly compressed insulation batt eliminates the need for stapling to hold the insulation product 10 in place. Subsequently, installation time as well as the labor expended to complete installation is significantly reduced, with installation of the insulation product 10 of the invention being at least 10 percent faster, and possibly up to 50 percent faster than the time required to install standard asphalt/kraft flanged faced insulation or unfaced insulation used with a separately installed vapor barrier. The time savings come from elimination of the fastening operation, as will be explained below.

Figure 9:
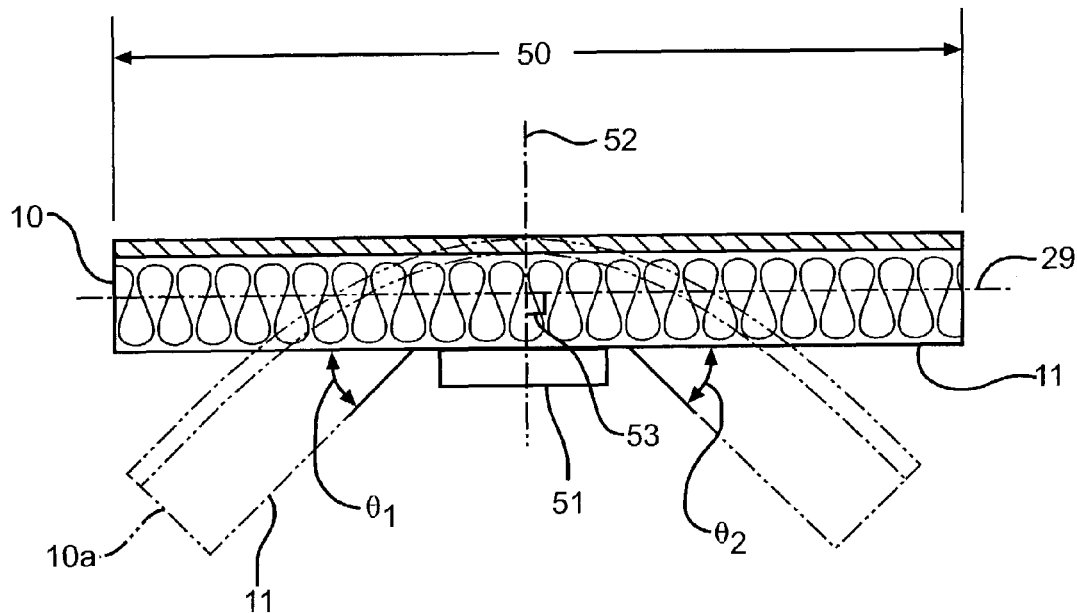
FIG. 9 is a sectional view of the test performed to determine the stiffness of the insulation product of the present invention.

In order for the compression fit installation technique to be successful, the insulation product 10 may need to meet certain stiffness and compressibility requirements. The stiffness of the insulation product 10 is generally determined by measuring the deflection of the insulation product 10, as shown in FIG. 9. To obtain the stiffness measurement, a support 51 is placed at the center axis 52 of an insulation product 10 of a finite test length 50. Preferably, the test length 50 for the stiffness test is forty eight inches, although any length suitable for performing the stiffness test may be used. The major surface 11 of the insulation product is placed on the support 51.

Prior to any deflection or draping of the insulation product 10, the longitudinal center axis 29 of the insulation product 10 is perpendicular to the support, as indicated at 53. This perpendicular or undraped configuration 53 of the major surface 11 of the insulation product 10 relative to the support 51 represents a stiffness angle measurement of 0 degrees. The insulation product is then permitted to drape over of the support 51, causing a deflection of the major surface 11 of the insulation product 10 on either side of the support 51. The draped outline of the insulation product is indicated in phantom lines at 10a. The angles of deflection $\theta_1$ and $\theta_2$ are measures of the angles between the major face 11 of the batt in the undraped position and the major face 11 of the insulation product 10a in the draped position, as measured on either side of the support 51. The batt is then turned over and the entire measuring process is repeated. The angles of deflection $\theta_1$ and $\theta_2$ are then averaged together to yield the overall stiffness measurement for the insulation product 10. An acceptable stiffness measurement for the insulation product 10, after packaging and storage for six weeks, that allows the insulation product to be used for a compression fit installation is within the range of from about 10 degrees to about 50 degrees, and most preferably within the range of from about 10 degrees to about 25 degrees.

Another particular advantage of the flangeless faced insulation product 10 of the present invention is that an improved seal of the vapor barrier is obtained when compared with typical installations of flanged insulation products. Vapor barrier protection is necessary to prevent moisture-laden air from the warm interior of the dwelling from entering the insulation product 10, condensing within the insulation blanket 12, and subsequently impairing the designed efficiency of the insulation product 10. To prevent moisture infiltration into the insulation blanket 12, it is preferable to have intimate contact between the vapor barrier or facing 20 and each of the two wall studs 44 defining the insulation wall cavity 42.

In a conventional installation of flanged wall insulation products, the flanges are used in two different ways to secure the conventional insulation product in a wall cavity. In the first conventional installation method, known as "face stapling" and shown in FIG. 10, flanges 46 of a flanged batt 10b are stapled with staples 47 onto the exposed narrow edges 45 of the wall studs 44. Although this face stapling installation method provides a good seal of the facing 20 to the studs 44 and therefore provides a good vapor barrier system, the conventional face stapling installation method is undesirable precisely because it covers the exposed edges 45 of the studs 44. By covering the exposed edges 45 of the studs 44, subsequent use of the studs for gluing of drywall is precluded. The drywall cannot be glued to the studs if the studs are covered with the flanges 46.

Figure 11:
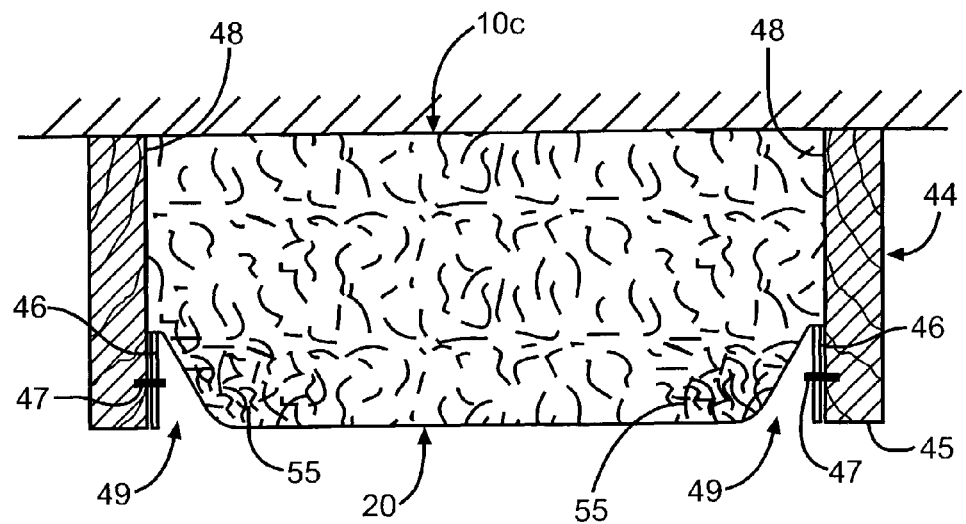
FIG. 11 is a plan view of a portion of the insulation wall cavity of FIG. 10 taken along line 11-11, showing the inset method of installing flanged insulation in a wall cavity.
Figure 10:
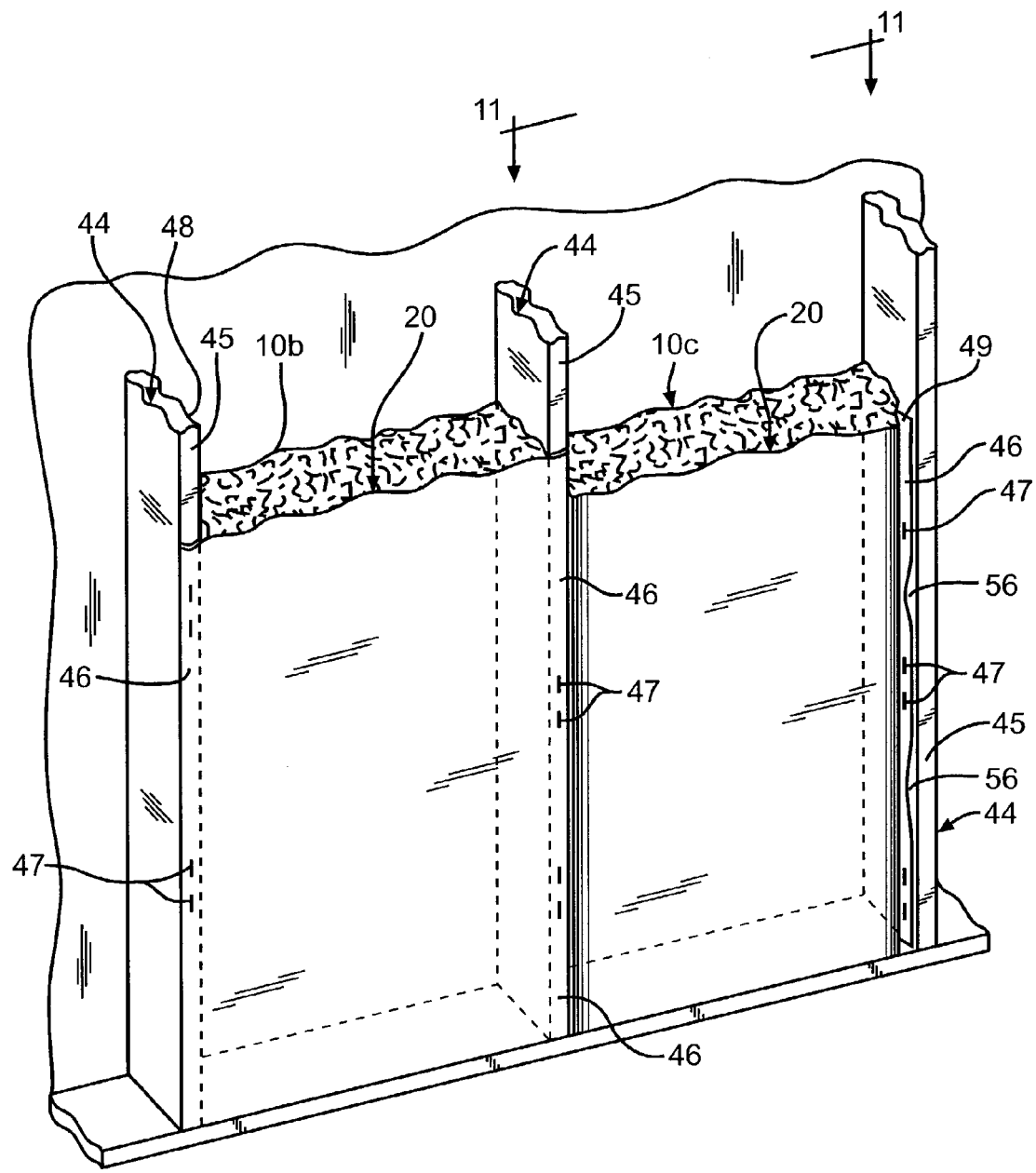
FIG. 10 is a perspective view of insulation wall cavities insulated using prior art installation methods.

As a result of the desire to avoid covering the stud edges 45 with the flanges 46, a second conventional installation method is preferred. In this second conventional method, as shown in FIGS. 10 and 11, a conventional flanged batt 10c is installed with inset stapling. In the inset stapling method, the flanges 46 of the batt 10c are folded and applied with staples 47 to the interior faces 48 of the studs 44. It can be seen in FIG. 11 that a vertical crease 49 is created at each front corner of the insulation cavity. This results in two areas having no insulation material, i.e., the creases 49, as well two areas 55 of overcompressed insulation. Therefore, inset stapling of the flanges results in an incomplete delivery of the R-value of the insulation product. The effect of these creases 49 and areas 55 of overcompression is undesirable, and the insulation system of the invention provides improved efficiency and aesthetics. Another problem, caused by imperfections in the studs or inadvertent bunching of the flanges during the stapling process, is a condition referred to as "fishmouth", where the flanges are bulged away from the interior faces 48 of the studs 44, creating gaps 56. This usually happens when the flange is not perfectly flattened against the interior face 48 of the stud 44 during the application of the staples. These gaps 56 give the installation job an unsightly, unprofessional look, and can provide paths for an undesirable entry of water vapor into the insulation product.

An additional problem with both of the conventional installation methods, stud face stapling and inset stapling, is that each method requires a large number of staples. A typical eight foot wall cavity insulated with either of the two conventional methods involves the application of dozens of staples. Even with the use of modern staple guns, there are still ergonomic and time efficiency problems involved with the requirement for stapling. The insulation installer is required to bend and stretch to reach the flanges for stapling, and must twist his hands at awkward angles. Also, the staple guns have to re-loaded constantly. Additionally, the cost of the staples adds to the cost of the insulation job.

Standard wall cavities 42 based upon 16 inch spacings between the studs 44 defining the wall cavities 42 are approximately 14½ inches in width. The insulation product 10 of the invention, in contrast to the conventional products of the prior art, is a flangeless product, and has a facing material 20 that is preferably from about 15 inches to about 15⅜ inches in width. Using the compression fit installation technique, the small additional width of the insulation product 10 beyond that of the nominal width of the insulation cavity 42 dictates that the insulation product 10 must be compressed laterally before being placed inside the insulation wall cavity 42. When the compression force used for installation is released, the insulation product 10 expands, but only to the extent of the width $X_2$ of the insulation cavity 42. The elimination of the flanges for the insulation product 10, as well as the slightly increased width of the facing material 20 and the insulation blanket 12 over standard widths, creates a tight seal between the facing material 20 and the studs 44 defining the insulation wall cavity 42. It is this tight seal between the facing material 20 and the studs 44 that subsequently prevents moisture laden air from reaching the insulation blanket 12 of the insulation product 10, thereby providing superior vapor barrier protection in contrast to a similarly installed inset stapled flanged product. Additionally, the elimination of the flanges and the step of fastening of the flanges furnishes an insulation product 10 with an aesthetically pleasing smooth appearance when compared with a similarly installed inset stapled flanged product.

Another advantage of the flangeless insulation product 10 of the invention is that during manufacturing a full machine-width of insulation material can be faced all at once and then slit into individual lanes of strip insulation material, each lane having the insulation blanket and facing material of the same width. Also, it is to be understood that the insulation products of the invention can be applied to insulation cavities other than wall cavities.

An additional advantage of the invention is that, by eliminating the flanges, the product is easier and quicker to cut thereby speeding the application of the product when it needs to be cut to fit the specific insulation cavities. Without the flanges the product is much less likely to tear during cutting of the batt, and this will result in a better vapor barrier and improved appearance, especially around objects, such as electrical boxes, in the stud cavities.

Still another advantage of the invention is that without flanges, the insulation supervisor, the building inspector, the builder and the prospective home owner can all visually inspect the completed installation job and easily determine whether or not the insulation material extends the full width of the wall cavity, reaching all the way to the studs. Although most wall cavities (or other insulation cavities) are of standard size, a small percentage of them are oversized. A problem in insulating these extra wide wall cavities is that the insulation may not extend all the way to each stud. cavity. If the gap between the insulation batt and the stud is less than one inch wide, the gap can be easily covered by the flange, making the uninsulated gap difficult to see, and therefore more likely not to be corrected.

In a specific embodiment of the invention, the width of the insulation blanket 12 and the width of the facing material 20 are within the range of from about 102 percent to about 107 percent of the known nominal width of the plurality of insulation wall cavities. For a typical insulation cavity having a known nominal width of approximately 14½ inches, the system of the invention provides flangeless insulation products in which the width of the insulation blanket 12 and the width of the facing material 20 are preferably within the range of from about 15⅛ to about 15⅜ inches, and most preferably approximately 15¼ inches. Where such a product is designed for 2×4 wall stud construction, the insulation blanket preferably has a density of about 0.75 pounds per cubic foot. Where such a product is designed for 2×6 wall stud construction, the insulation blanket preferably has a density of about 0.45 pounds per cubic foot.

In another specific embodiment of the invention, the facing material 20 has a width wider than the width of the insulation blanket 12 by an amount within the range of from about 1.0 percent to about 3.0 percent of the width of the insulation blanket 12. More preferably, the facing material 20 has a width wider than the width of the insulation blanket 12 by an amount within the range of from about 1.5 percent to about 2.0 percent of the width of the insulation blanket 12. The width of the facing material 20 is greater than the nominal width of the insulation cavities 40 for which the insulation products are designed. The increased width of the facing material 20 improves the seal of the insulation product when placed within insulation wall cavities 40 of the known nominal width in comparison to the seal provided by conventional flanged insulation products applied with inset stapling to the same insulation wall cavities. For a typical insulation cavity having a known nominal width of approximately 14½ inches, the system of the invention provides flangeless insulation products in which the width of the insulation blanket 12 is approximately 15 inches, and the width of the facing material 20 is within the range of from about 15⅛ to about 15⅜ inches, and most preferably approximately 15¼ inches. Where such a product is designed for 2×4 wall stud construction, the insulation blanket preferably has a density of about 1.25 pounds per cubic foot. Where such a product is designed for 2×6 wall stud construction, the insulation blanket preferably has a density of about 0.75 pounds per cubic foot. Where the insulation products 10 are designed as heavy density insulation products having higher R-values than standard products, the for width of a major surface 13 of the insulation blanket 12 is preferably within the range of from about 14⅞ to about 15⅛ inches, and most preferably approximately 15 inches.

In summary, the system and product of the invention optimize the width of the fibrous insulation material to maximize the ease of installation, and to maximize the confidence that the insulation will stay in place in the insulation cavity for the life of the product.

The principle and mode of operation of this invention have been described in its preferred embodiments. However, it should be noted that this invention may be practiced otherwise than as specifically illustrated and described without departing from its scope.

What is claimed is:

1. An insulated building system comprising:
   a plurality of wall cavities defined between wall studs which are spaced by a known nominal width; and
   insulation batts insulating the wall cavities, said insulation batts including:
      elongated blankets of fibrous insulation material entirely positioned within the wall cavities, said elongated blankets having a face portion and edges defining a blanket width which is greater than the known nominal width of the wall cavities; and
      a facing material attached to and extending only across the face portion of the elongated blankets of fibrous insulation material, and also being entirely positioned within the wall cavities, said facing material having a facing width which is at least equal to the blanket width but no greater than about 3% wider than the blanket width, wherein the increased width of the facing material is wide enough to improve the seal of the facing material when placed within wall cavities of the known nominal width in comparison to the seal provided by flanged insulation products applied with inset stapling to the same wall cavities, and wherein the width of the facing material is narrow enough to allow for easy inspection to determine whether the blanket extends the full nominal width of the plurality of wall cavities.

2. The system of claim 1 wherein the width of the facing material is within the range of from about 102 percent to about 107 percent of the known nominal width of the plurality of insulation wall cavities.

3. The system of claim 1 wherein the known nominal width of the insulation cavities is approximately 14½ inches, the width of the insulation blanket is approximately 15 inches, and the width of the facing material is approximately 15¼ inches.

4. The system of claim 3 wherein the insulation blanket has a density of about 1.25 pounds per cubic foot.

5. The system of claim 3 wherein the insulation blanket has a density of about 0.75 pounds per cubic foot.

6. The system of claim 1 in which the facing material has a width wider than the width of the insulation blanket by an amount within the range of from about 1.5 percent to about 2.0 percent of the width of the insulation blanket.

7. The system of claim 1 wherein the insulation products have a stiffness characterized by an angle measurement that measures the amount of deflection of the insulation products as the insulation products are draped over a support located perpendicular to the longitudinal center axis of the insulation product, wherein the stiffness measurement is within the range from about 15 degrees to about 35 degrees.

8. The system of claim 1 wherein the facing material is an asphalt/kraft paper or polymer/kraft paper facing material.

9. A flangeless insulation batt, comprising:
   (a) an elongated blanket of fibrous insulation material having edges defining a width of a major surface of the insulation blanket, wherein the width of the major surface is within the range of from about 15⅛ to about 15⅜ inches;
   (b) an elongated strip of facing material adhered to the insulation blanket, wherein the facing material has a facing width which is at least equal to the blanket width but no greater than about 3% wider than the blanket width wherein the insulation batt has a stiffness characterized by an angle measurement that measures the amount of deflection of the insulation product as the insulation product is draped over a support located perpendicular to the longitudinal center axis of the insulation product, wherein the stiffness measurement is within the range from about 15 degrees to about 35 degrees.

10. The flangeless insulation batt of claim 9 having a density of about 0.75 pounds per cubic foot.

11. The flangeless insulation batt of claim 9 having a density of about 0.45 pounds per cubic foot.

12. The flangeless insulation batt of claim 9 wherein the width of the facing material is about 15¼ inches.

13. The flangeless insulation batt of claim 9 wherein the facing material is an asphalt/kraft paper or polymer/kraft paper facing material.

14. An insulated building system for providing insulation products for a plurality of insulation wall cavities comprising:
   a plurality of wall cavities defined between wall studs which are spaced by a known nominal width; and
   a plurality of insulation batts insulating the wall cavities, said insulation batts including:
      an elongated blanket of fibrous insulation material entirely positioned within the wall cavities, said elongated blanket having a face portions and edges defining a blanket width which is greater than the known nominal width of the wall cavities; and
      facing materials attached to and extending only across the face portion of the elongated blanket of fibrous insulation material, and also being entirely positioned within the wall cavities, said facing materials having a facing width which is at least equal to the widths of the blanket but no greater than about 3% wider than the widths of the blanket,
   wherein the facing material is coated with an adhesive layer to bond the facing material to the blanket, wherein the adhesive layer is aligned about an axis on the facing material and the blanket so as to form uncoated edges on the facing material and the blanket,
   wherein the width of the blanket and the width of the facing material are greater than the nominal width of the plurality of cavities, wherein the increased width of the facing material provides a seal of the facing material when the insulation products are compression fit within the wall cavities of the known nominal width.

15. The system of claim 14 wherein the width of the insulation blanket and the width of the facing material are within the range of from about 102 percent to about 107 percent of the known nominal width of the plurality of insulation wall cavities.

16. The system of claim 14 wherein the known nominal width of the insulation cavities is approximately 14½ inches, and the width of the insulation blanket and the width of the facing material are approximately 15¼ inches.

17. The system of claim 14 wherein the insulation blanket has a density of about 0.75 pounds per cubic foot.

18. The system of claim 17 wherein the insulation blanket has a density of about 0.45 pounds per cubic foot.

19. The system of claim 14 wherein the facing material is an asphalt/kraft paper or polymer/kraft paper facing material.

20. An insulated building system comprising:
   a wall cavity defined between wall studs which are spaced by a known nominal width; and
   an insulation ban insulating the wall cavity, said insulation batt including:
      an elongated blanket of fibrous insulation material entirely positioned within the wall cavity, said elongated blanket having a face portion and edges defining a blanket width which is greater than the known nominal width of the wall cavity; and
      a facing material attached to and extending only across the face portion of the elongated blanket of fibrous insulation material, and also being entirely positioned within the wall cavity, said facing material having a facing width which is at least equal to the blanket width but no greater than about 3% wider than the blanket width.

21. The system of claim 20 wherein the width of the insulation blanket and the width of the facing material are within the range of from about 102 percent to about 107 percent of the known nominal width of the plurality of insulation wall cavities.

22. The system of claim 20 wherein the known nominal width of the insulation cavities is approximately 14½ inches, and the width of the insulation blanket and the width of the facing material are approximately 15¼ inches.

23. The system of claim 22 wherein the insulation blanket has a density of about 0.75 pounds per cubic foot.

24. The system of claim 22 wherein the insulation blanket has a density of about 0.45 pounds per cubic foot.

25. The system of claim 20 wherein the facing material is an asphalt/kraft paper or polymer/kraft paper facing material.

26. An insulation batt for insulating a wall cavity defined between wall studs that are spaced by a known nominal width comprising:
   an elongated blanket of fibrous insulation material adapted to be entirely positioned within the wall cavity, said elongated blanket having a face portion and edges defining a blanket width which is greater than the known nominal width of the wall cavity; and
   a facing material attached to and extending only across the face portion of the elongated blanket of fibrous insulation material, said facing material having a facing width which is at least equal to the blanket width but no greater than about 3% wider than the blanket width.

27. The insulation batt of claim 26 having a density of about 1.25 pounds per cubic foot.

28. The insulation batt of claim 26 having a density of about 0.75 pounds per cubic foot.

29. The insulation batt of claim 26 wherein the width of the facing material is about 15¼ inches.

30. The insulation batt of claim 26 wherein the insulation product has a stiffness characterized by an angle measurement that measures the amount of deflection of the insulation product as the insulation product is draped over a support located perpendicular to the longitudinal center axis of the insulation product, wherein the stiffness measurement is within the range from about 15 degrees to about 35 degrees.

31. The insulation batt of claim 26 wherein the facing material is an asphalt/kraft paper or polymer/kraft paper facing material.

32. The insulation batt of claim 26 wherein the facing width is substantially equal to the blanket width.

33. The insulation batt of claim 26 wherein the blanket width is within the range of from about 15⅛ to about 15⅜ inches.

\* \* \* \* \*